(12) United States Patent
Yu et al.

(10) Patent No.: US 6,871,201 B2
(45) Date of Patent: Mar. 22, 2005

(54) METHOD FOR BUILDING SPACE-SPLITTING DECISION TREE

(75) Inventors: Philip Shi-lung Yu, Chappaqua, NY (US); Haixun Wang, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 09/918,952

(22) Filed: Jul. 31, 2001

(65) Prior Publication Data

US 2003/0061213 A1 Mar. 27, 2003

(51) Int. Cl.[7] .............................................. G06F 17/30
(52) U.S. Cl. ............................... 707/7; 707/5; 707/102
(58) Field of Search .................... 707/1–10, 100–104.1, 707/200–206

(56) References Cited

U.S. PATENT DOCUMENTS

| | | | | |
|---|---|---|---|---|
| 5,799,311 A | * | 8/1998 | Agrawal et al. | 707/102 |
| 6,360,227 B1 | * | 3/2002 | Aggarwal et al. | 707/102 |
| 6,381,605 B1 | * | 4/2002 | Kothuri et al. | 707/100 |
| 6,546,389 B1 | * | 4/2003 | Agrawal et al. | 707/6 |

OTHER PUBLICATIONS

Ramaswamy et al., Efficient Algorithms for Mining Outliers from Large Data Sets, May 2000, ACM, 427–438.*
Shafer, John, et al., *SPRINT: A Scalable Parallel Classifier for Data Mining*, Proceedings of the 22nd VLDB Conference, Bombay, India, 1996, pp. 1–12.
Brodley, Carla E., et al., *Multivariate Decision Trees*, COINS Technical Report 92–82, Dec. 1992, pp. 1–36.

* cited by examiner

*Primary Examiner*—Shahid Alam
*Assistant Examiner*—Jean Bolte Fleurantin
(74) *Attorney, Agent, or Firm*—F. Chau & Associates, LLC

(57) ABSTRACT

A method is provided for data classification that achieves improved interpretability and accuracy while preserving the efficiency and scalability of univariate decision trees. To build a compact decision tree, the method searches for clusters in subspaces to enable multivariate splitting based on weighted distances to such a cluster. To classify an instance more accurately, the method performs a nearest neighbor (NN) search among the potential nearest leaf nodes of the instance. The similarity measure used in the NN search is based on Euclidean distances defined in different subspaces for different leaf nodes. Since instances are scored by their similarity to a certain class, this approach provides an effective means for target selection that is not supported well by conventional decision trees.

9 Claims, 12 Drawing Sheets

US 6,871,201 B2

METHOD FOR BUILDING SPACE-SPLITTING DECISION TREE

BACKGROUND OF THE INVENTION

1. Technical Field

The present invention relates generally to data mining and, in particular, to a method for building space-splitting decision trees. The method may be employed in decision-tree based classification where the training set has a very biased data distribution.

2. Description of Related Art

Classification represents a very important data mining problem. Algorithms that build scalable classifiers were first described by J. C. Shafer et al., in "SPRINT: A Scalable Parallel Classifier for Data Mining", Proceedings of the 22nd Very Large Database (VLDB) Conference, September 1999. The input database, also called training set, consists of a number of records with a fixed number of attributes. Attributes whose underlying domain is totally ordered are called ordered attributes, whereas attributes whose underlying domain is not ordered are called categorical attributes. There is one distinguished categorical attribute which specifies the class label of each record. The objective of classification is to generate a concise and accurate description or a model for each class label in the training set. The model so generated is used to classify future data sets for which the class labels are unknown.

According to the prior art, such as the aforementioned SPRINT algorithm, scalable methods have been created for efficiently learning a classifier using a large training set. However, these methods offer poor predictive accuracy when the training set has a very biased data distribution. Most learning algorithms, such as decision trees, will generate a trivial model that always predicts the majority class and reports an accuracy rate of 99%. However, the users are often only interested in data cases of the biased class. Decision trees have been shown unsuitable for such tasks. Up-sampling the biased class can avoid building trivial models. However, the benefits of up-sampling is limited. A decision tree that assigns an unknown instance a definite class label ("positive" or "negative") or a probability based merely on the data distribution in the leaf nodes usually has a low predictive accuracy for instances of the biased target class. Furthermore, the model can hardly discriminate among the majority data on the basis of their closeness to the target class. This causes problems in applications such as target marketing: the marketing department wants to send out promotions to 20% of the people in their database while only 1% of the people in the database are recorded buyers. The remaining 19% have to be selected based on their closeness to the buyer class.

Additionally, prior art decision trees are usually very large, which hampers the interpretability of the model. Other methods, such as those described by Broadley et al., in "Multivariate Decision Trees", Machine Learning, Vol. 19, pp. 45–77, 1995, try to build compact decision trees using multivariate splitting conditions. However, these methods are not applicable to large training sets because performing a multivariate partition often leads to a much larger consumption of computation time and memory, which may be prohibitive for large data sets.

Another shortcoming of the decision tree is that, as a "greedy" process, the decision tree induction process sometimes fails to discover all the patterns in the data.

| Foreground | Background | Clear? |
|---|---|---|
| white | black | yes |
| white | black | yes |
| white | white | no |
| silver | white | no |
| silver | white | no |
| silver | white | no |
| silver | white | no |
| light gray | black | yes |
| light gray | white | no |
| black | light grey | yes |

Consider the training set above, where "Clear?" is the class label. A prior art decision tree such as that referenced above always makes a split on the "Background" attribute, and partitions the training set into three leaf nodes, each made up of data cases from a single class. However, this seemingly perfect tree totally ignores the "Foreground" attribute, which also provides valuable information of the class distribution. For instance, silver foreground always implies that it is not clear. Given an instance (silver, light grey), the decision tree predicts Yes since its background is "light grey", although the instance is much closer to pattern (silver, white), which forms a No pattern with strong support.

Thus, there is a need for a method for building a compact decision tree model on a data set. The method must be scalable to deal with large amounts of data frequently found in market analysis.

There is also a need for a method which provides a meaningful model when the underlying data set is very biased and the data records of the rare class are more important to the users. Furthermore, there is a need for a method which can efficiently score the data based on the closeness of the data to the target class.

SUMMARY OF THE INVENTION

The problems stated above, as well as other related problems of the prior art, are solved by the present invention, a method for building space splitting decision trees.

The present invention is directed to building compact decision trees and making accurate predictions even when the training set has a very biased data distribution. The present invention is also capable of ordering data samples based on the closeness of the data samples to the target class (the biased class) and, thus, can be used for target selection.

According to an aspect of the present invention, there is provided a method for building a decision tree from an input data set. The input data set comprises records and associated attributes. The attributes include a class label attribute for indicating whether a given record is a member of a target class or a non-target class. The input data set is biased in favor of the records of the non-target class. The decision tree comprises a plurality of nodes that include a root node and leaf nodes. The method comprises the step of constructing the decision tree from the input data set, including the step of partitioning each of the plurality of nodes of the decision tree, beginning with the root node, based upon multivariate subspace splitting criteria. Distance functions are computed for each of the leaf nodes. A nearest neighbor set of nodes is identified, with respect to the distance functions, for each of the leaf nodes based upon a respective closeness of the nearest neighbor set of nodes to a target record of the target class. The records are classified and scored, based upon the decision tree and the nearest neighbor set of nodes.

According to another aspect of the present invention, the partitioning step comprises the step of, for a current leaf node from among the leaf nodes of the decision tree, computing a lowest value of a gini index achieved by univariate-based partitions on each of a plurality of attribute lists included in the current leaf node.

According to yet another aspect of the present invention, the partitioning step further comprises the step of detecting subspace clusters of the records of the target class associated with the current leaf node. The lowest value of the gini index achieved by distance-based partitions on each of the plurality of attribute lists included in the current leaf node is computed. The distance-based partitions are based on distances to the detected subspace clusters. Pre-sorted attribute lists included in the current node are partitioned into two sets of ordered attribute lists based upon a greater one of the lowest value of the gini index achieved by univariate partitions and the lowest value of the gini index achieved by distance-based partitions. New child nodes are created for each of the two sets of ordered attribute lists.

According to still another aspect of the present invention, the detecting step comprises the step of computing a minimum support (minsup) of each of the subspace clusters that have a potential of providing a lower gini index than that provided by the univariate-based partitions. One-dimensional clusters of the records of the target class associated with the current leaf node are identified. Beginning with the one-dimensional clusters, centroids of K-dimensional clusters are combined to form candidate (K+1)-dimensional clusters. A number of the records of the target class that fall into each of the (K+1)-dimensional clusters are identified. Any of the (K+1)-dimensional clusters that have a support lower than the minsup are pruned.

According to yet still another aspect of the present invention, the step of computing the lowest value of the gini index achieved by distance-based partitions comprises the step of identifying eligible subspace clusters from among the subspace clusters. An eligible subspace cluster has a set of clustered dimensions such that only less than all of the clustered dimensions in the set are capable of being included in another set of clustered dimensions of another subspace cluster. Top-K clusters are selected from among the eligible subspace clusters. The top-K clusters are ordered by a number of records therein. For each of a current top-K cluster: a centroid of the current top-K cluster and a weight on each dimension of the current top-K cluster are computed; the gini index of the current top-K cluster is computed, based on a weighted Euclidean distance to the centroid; and a lowest gini index achieved by the step of computing the gini index of the current top-K cluster is recorded.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
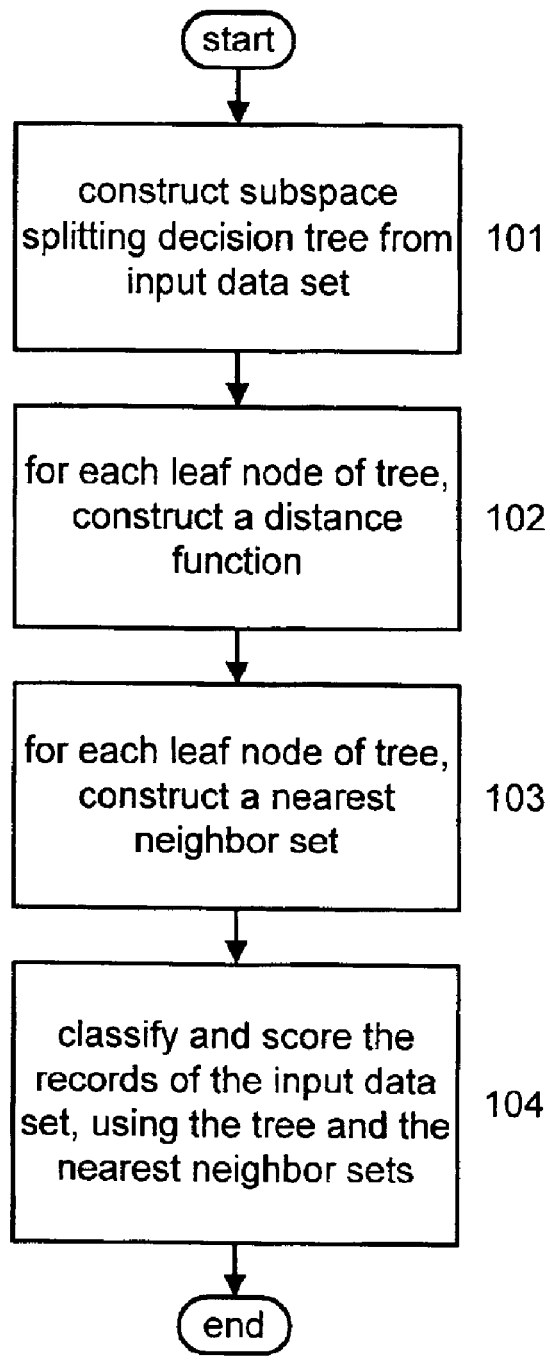
FIG. 1 is a diagram illustrating the overall process of subspace splitting decision tree construction and the use of the decision tree for classification and scoring, according to an illustrative embodiment of the invention.

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the method steps depicted in the accompanying Figures may be implemented in hardware, the actual connections between the steps may differ depending upon the manner in which the present invention is implemented. Given the teachings herein, one of ordinary skill in the related art will be able to contemplate these and similar implementations or configurations of the present invention.

As used herein, the term "positive" refers to a particular class of interest, that is, a target class. Moreover, the term "negative" refers to any class other than the target class.

A brief description of an illustrative embodiment of the invention will now be given to introduce the reader to the concepts of the invention. In the illustrative embodiment, the invention includes the following two parts: (1) the construction of a subspace splitting decision tree; and (2) a nearest neighbor search method for data scoring.

The method improves decision tree construction by providing an additional splitting criterion which results in smaller and improved decision trees as described below. The motivation is that, in target selection, while the negative instances are distributed "everywhere", instances of the target class often form clusters in some subspaces. These clusters are the foundation of any possible accurate predictions of unknown instances. The method uses an efficient multivariate search for subspace clusters so as to enable splitting based on weighted distances to the centroid of the cluster.

A traditional decision tree makes splits based on single attribute values. The traditional decision tree studies the distribution of the multidimensional points projected into a one dimensional space, and tries to separate the points of different class labels. When this is not successful, a natural extension would be studying the distribution of the points projected into a two or even higher dimensional subspace to identify clustered regions of the different classes. That is to say the invention can now split subspaces (not just 1-dimensional intervals) in building the decision tree. While it is computationally prohibitive to search for all the clusters, it is more feasible to search for clusters formed by points in the biased target class.

The method of the invention finds the subspace (a relevant subset of dimensions), the centroid of the cluster, and the radius on each dimension. A distance function needs to be devised to measure the closeness between points in the clustered subspace, and the scale difference in each of the dimensions has to be taken into consideration.

The method of the invention further improves the classification by performing a nearest neighbor search after the leaf node that holds the prediction for an unknown instance is identified. The nearest neighbor search can identify the closest matching patterns for an unknown instance, but is generally less efficient than the decision tree. The method combines the two approaches to provide nearest neighbor matching with the efficiency and interpretability of the decision tree. The method introduces the notion of a scoring function and that of a nearest leaf node set for each leaf node and performs a nearest neighbor search among the nearest leaf node set based on the scoring function. The scoring function also provides an effective means for target selection.

The invention provides a method to (1) measure the closeness of a given point to any of the leaf nodes, and (2) choose the candidate leaf nodes that should be evaluated. The Euclidean distance metric defined in the full dimensional space is inadequate for scoring because it can be dominated by many irrelevant or noisy dimensions. There is also the issue that the scale on different dimensions of each leaf node can be very different. The distance measure needs to be based upon an appropriately selected subset of the dimensions and normalized to reflect the scale difference. To determine the likely class label, the method also factors in the purity or confidence of the leaf node. A new concept of the scoring function is thus introduced.

A brief description of the present invention will now be given with respect to FIG. 1. More detailed descriptions of the present invention follow with respect to FIGS. 2–12.

FIG. 1 is a diagram illustrating the overall process of classifying and scoring data sets with biased distribution, according to an illustrative embodiment of the invention. First, a subspace splitting decision tree is constructed (step 101). Subspace splitting means that a multivariate test is performed on nodes of the decision tree, in addition to the traditional conditions that test only one attribute at a time in a decision tree. More specifically, the subspace splitting test takes the form of a weighted Euclidean distance function: Dist(record, centroid, weight)<v. In addition to the given record, the distance function requires the following parameters to perform the test: (1) the weights on each dimension which can be zero; (2) the centroid to which the distance from the record is to be evaluated; and (3) a splitting value, so that the test gives a Boolean result. The method finds all the parameters above. The distance function is thus defined in the subspace formed by those dimensions with a non-zero weight.

Next, for each leaf node of the decision tree created in step 101, the method constructs a distance function (step 102). The distance function again takes the form of the weighted Euclidean distance measure, however, the parameters are found in a different way. The weight parameters are of particular importance because they determine the subspace in which the distance functions are to be evaluated.

Then, the method constructs a nearest neighbor set for each leaf node of the tree (step 103). A nearest neighbor set of a leaf node is a set of nodes that can potentially assign a higher score to a record than the score assigned by the leaf node. The node (one of nodes in the nearest neighbor set or the leaf node) that assigns the lowest distance is chosen. The lowest distance, together with the confidence (an indication of the purity of a node), defines the score of a node.

Finally, in step 104, the decision tree induction process is combined with the nearest neighbor search method to give a score for each record.

Figure 2:
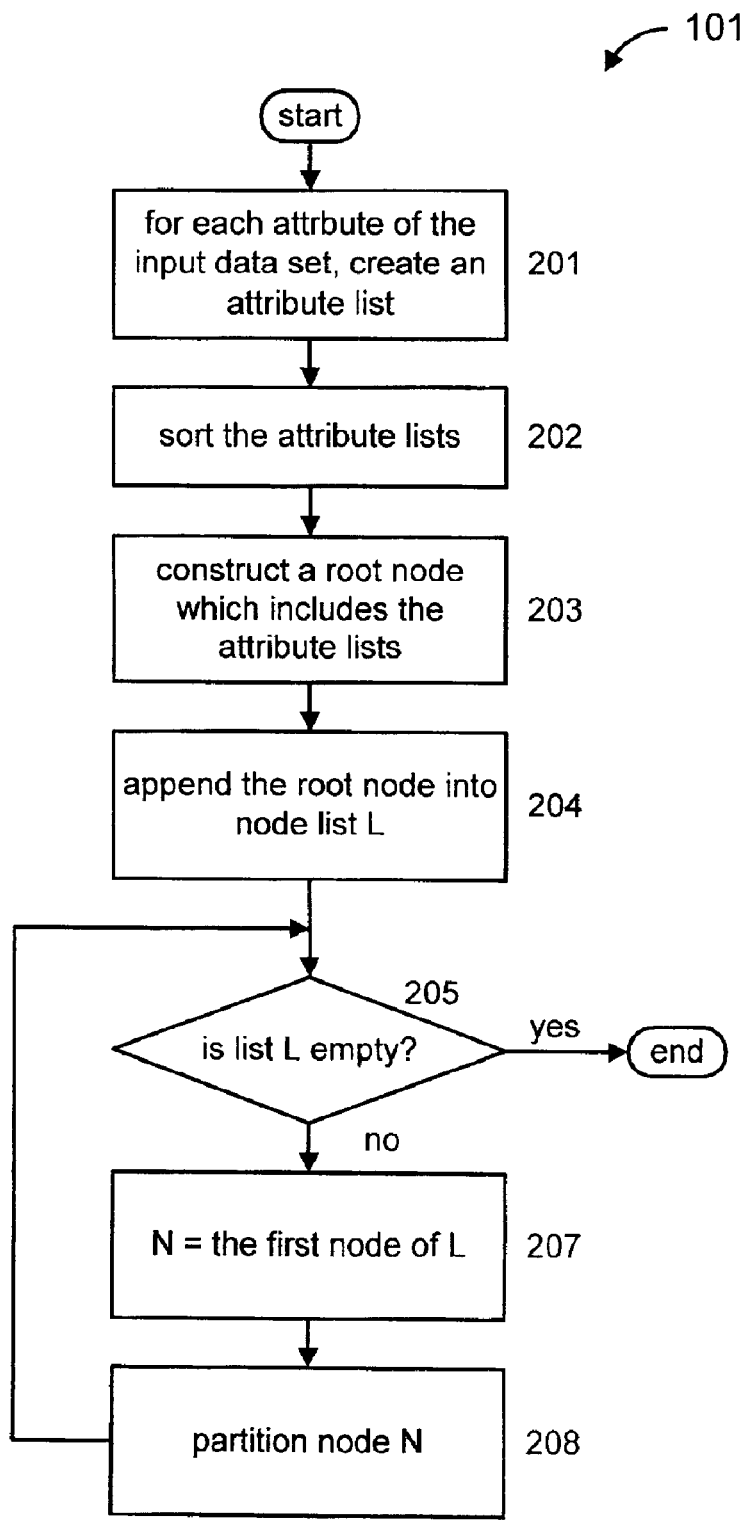
FIG. 2 is a diagram illustrating the process of constructing the subspace splitting decision tree (step 101 of FIG. 1), according to an illustrative embodiment of the invention.

FIG. 2 is a diagram illustrating the process of constructing the subspace splitting decision tree (step 101 of FIG. 1), according to an illustrative embodiment of the invention. First, the method constructs an attribute list for each attribute except for the class label attribute of the data set (step 201). Each entry in the attribute list is a triple, (rid, value, class_label), where "rid" is the record id of the record (assuming the records of the data set are numbered from 1 to N, where N is the total number of records), "value" is the value of the attribute, which has been normalized to the range of [0,1], and "class_label" is the class of this record. The class label can take on one of two possible values, positive and negative. The positive class is the target class, that is, the class the users are interested in. Thus, each record in the original data set is represented by K−1 entries, with each entry belonging to an attribute list, where K is the total number of attributes (including the class label). Each attribute list is organized as a disk resident file for large data sets.

Next, the method performs external merge sorts on each attribute list (step 202). This orders the entries in an attribute list by ascending attribute values.

Then, the method creates a root node of the decision tree, which contains all the sorted attribute lists (step 203). The root node also contains other information, such as the count of records of both classes. The method creates an empty list, and adds the root node into the list (step 204).

Next, the method enters a loop. It is determined whether the list L is empty (step 205). The method terminates only if there are no more nodes in the node list. Otherwise, the method gets the first node out of the node list (step 207), and partitions the node (step 208).

Figure 3:
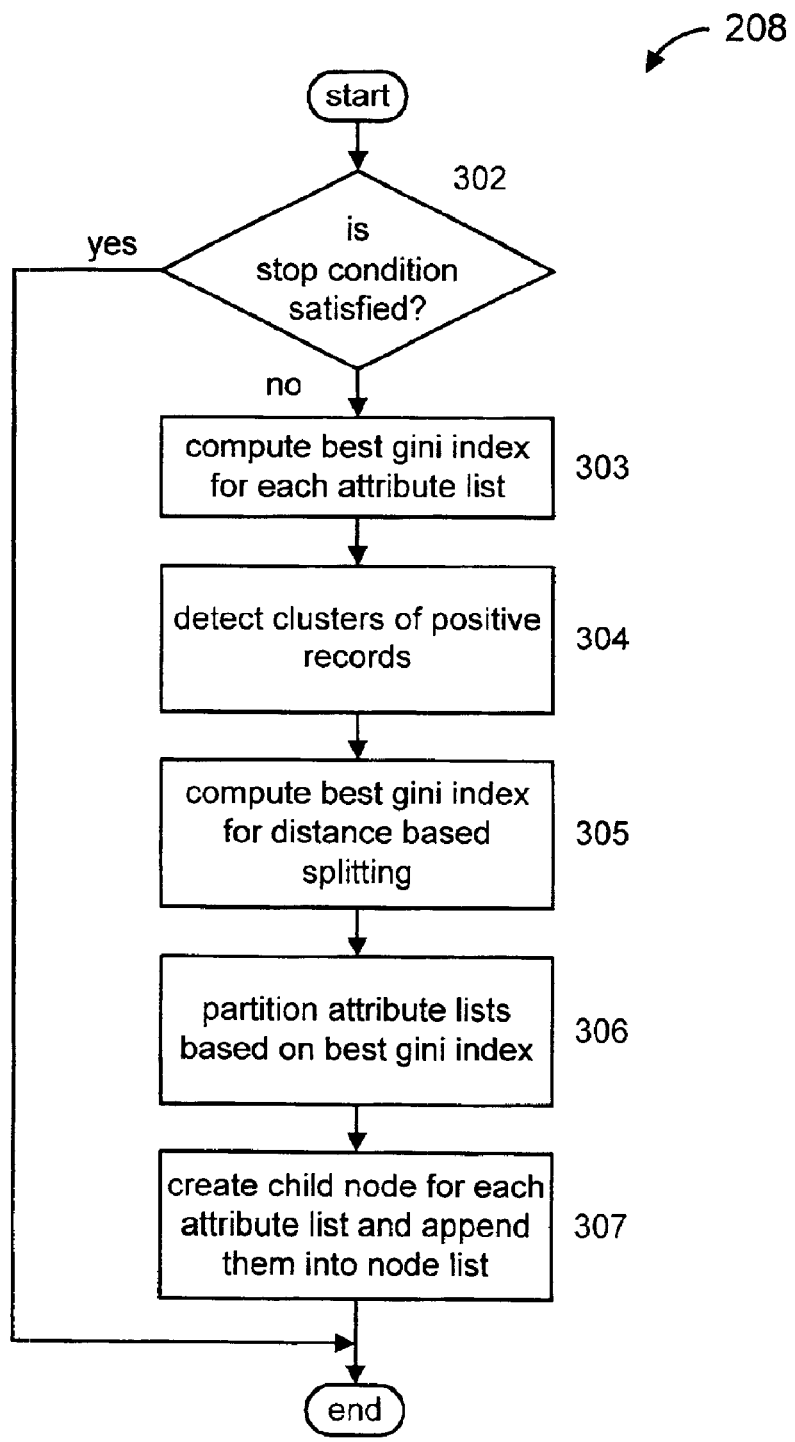
FIG. 3 is a diagram illustrating the process of splitting a node of the decision tree (step 208 of FIG. 2), according to an illustrative embodiment of the invention.

FIG. 3 is a diagram illustrating the process of splitting a node of the decision tree (step 208 of FIG. 2), according to an illustrative embodiment of the invention. The method starts by testing if the stop condition of partitioning is satisfied (step 302). The stop condition is satisfied if the node is pure (which means the node contains only records of one class label), or the percentage of the positive records is above a pre-specified threshold (e.g., 95%). The positive records are biased, and positive records are assigned a higher weight (W_p=nn/np, where nn is the number of negative records in the data set, and np is the number of positive records) in an effort to rebalance the data set, and negative records are assigned a unit weight. Thus, the data set has equal balance weight of positive records and negative records. The weights of records are taken into consideration when the gini index is evaluated.

A definition of the phrase "gini index" as used herein will now be given. In general, the gini index measures the probability of misclassifying a set of instances. Thus, for example, if a data set T contains examples from n classes, the gini index, gini(T), is defined as follows:

$$gini(T) = 1 - \sum_{j=1}^{n} p_j^2$$

where $p_j$ is the relative frequency of class j in T.

If a data set T is split into two subsets $T_1$ and $T_2$ with sizes $N_1$ and $N_2$ respectively, the gini index of the split data contains examples from n classes, and the gini index gini(T) is defined as follows:

$$gini_{split}(T) = \frac{N_1}{N} gini(T_1) + \frac{N_2}{N} gini(T_2)$$

The attribute that provides the smallest $gini_{split}$ (T) is chosen to split the node. While the gini index has been described in detail immediately above (and below) for the purpose of illustrating the same, other variations are possible. That is, given the teachings of the present invention provided herein, one of ordinary skill in the related art will contemplate the preceding and other variations of the gini index while maintaining the spirit and scope of the present invention.

Returning to the method of FIG. 3, if the stop condition is not satisfied, the method tries to partition the node as follows. First, the best gini index achieved by univariate splits on each attribute list is computed (step 303). For a data set d with two class labels, the gini index is defined as gini(d)=1−P_n^2−P_p^2, where P_n is the percentage of negative records and P_p is the percentage of positive records. The percentage is computed with the weights of records taken into consideration. Thus, the percentage of positive records, P_p, is defined as W_p*n_p/(W_p*n_p+n_n), where W_p is the weight of positive records, n_p and n_n are the number of positive and negative records in the current node, respectively. The method finds the splitting criteria which partition the data set d into two sets d1 and d2, such that the new gini index, defined as gini_p=n1/N*gini(d1)+n2/N*gini(d2), is minimum. To find the partition, each sorted attribute list is scanned and, at every position where there is a change in the attribute value, gini_p( ) is evaluated, and the following is recorded: (1) the minimal gini_p found thus far; (2) the attribute; and (3) the attribute value where this minimal gini_p occurs. After all the attribute lists are scanned and the gini index evaluated, the following are reported: a best gini index G_best; and a splitting condition A=v (meaning the best gini index is achieved when the data set is partitioned according to the value of attribute A).

Next, subspace clusters of positive records are detected (step 304). This process is detailed in FIG. 4. Then, in the next step (step 305), the best gini index achievable by splitting based on the distance to the clusters is computed. This process is detailed in FIG. 7.

After the best gini index is determined (whether it is based on single attribute splitting or cluster based splitting), the ordered attribute lists in the current node are partitioned into two sets of ordered attribute lists based on the best gini index (step 306). This process is detailed in FIG. 9.

Finally, the method creates new child nodes for each set of the partitioned attribute lists and appends the new child nodes into the node list to be queued for further partitioning (step 307).

Figure 4:
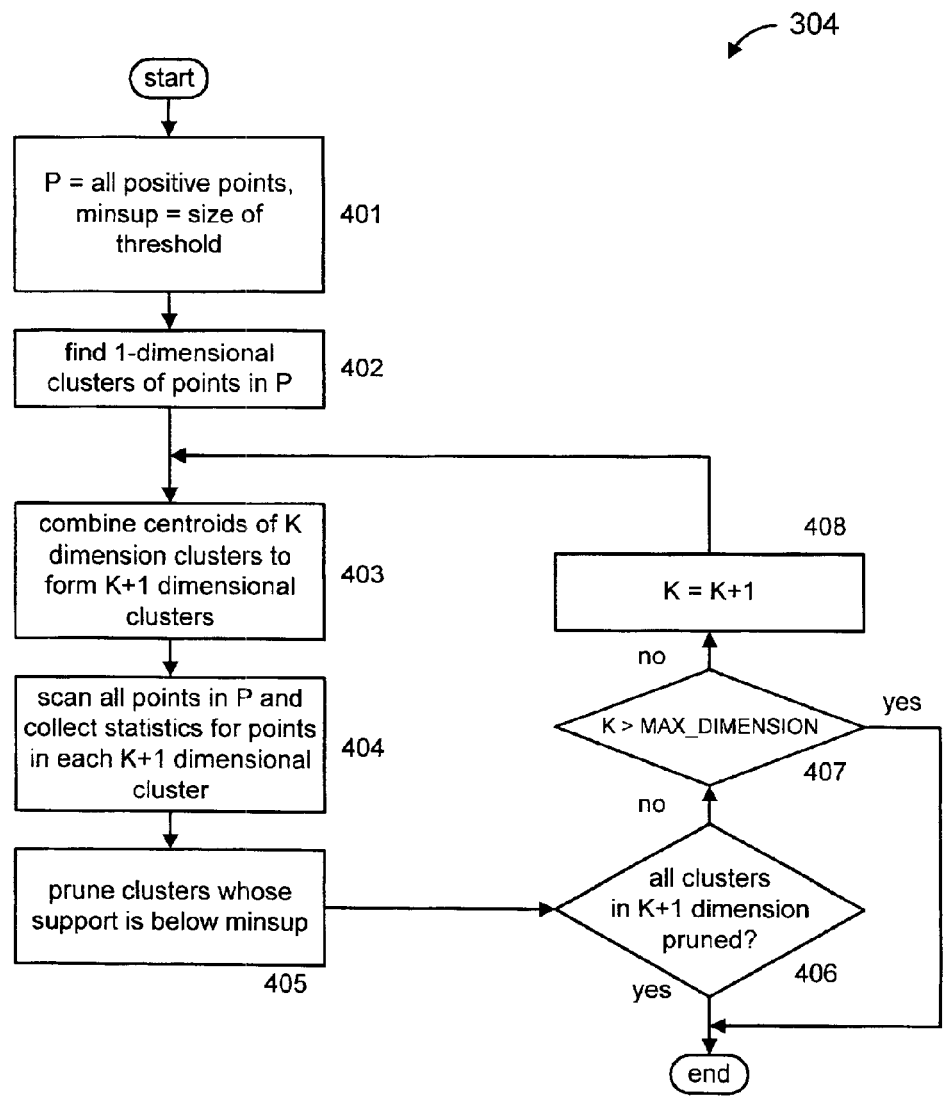
FIG. 4 is a diagram illustrating the process of detecting clusters of positive records (step 304 of FIG. 3), according to an illustrative embodiment of the invention.

FIG. 4 is a diagram illustrating the process of detecting clusters of positive records (step 304 of FIG. 3), according to an illustrative embodiment of the invention. That is, the method of FIG. 4 illustrates the process of computing the best gini index for distance based splitting.

The method only works on positive records in the data set. Since positive records only account for a small portion (such as, e.g., 1%) of the entire data set, the positive records are stored in memory. The support of a cluster is defined as n_p'/n_p, where n_p' is the number of positive records in the cluster, and n_p is the total number of positive records in the current node. The method computes minsup, i.e., the minimal support of a positive cluster that can possibly provide a gini index lower than those given by single-dimension partitions (step 401). The minsup is computed as follows: minsup=(2q−2q^2−G_best)/(2q−2q^2−qG_best), where G_best is the smallest gini index given by single attribute partitioning, q is n_p/n_n, and n_n is the total number of records in the current node.

Next, the method finds 1-dimensional clusters of positive records (step 402). A 1-dimensional cluster is represented by a pair (c,r), where c is the center of the clustered points on that dimension, and r is the radius of the cluster. Some of the candidate clusters that will not achieve a better gini index than G_best are eliminated. In particular, the clusters with a support lower than minsup are pruned. This process is detailed in FIG. 5.

Then, centroids of K-dimensional clusters are combined to form candidate (K+1)-dimensional clusters (step 403). A K-dimensional cluster is represented by K pairs, each K-dimensional cluster being of the form (c_i, r_i), where c is the center of the clustered records on that dimension, and r is the radius of the cluster. The method of combining lower dimensional clusters to form higher dimensional clusters is similar to the Apriori algorithm for finding frequent item sets. The method starts with 1-dimensional clusters, and repeatedly finds clusters in higher dimensions. The user specifies a parameter, MAX_DIMENSION, to indicate the highest dimension the process is to evaluate. MAX_DIMENSION=N−1, where N is the total number of attributes, including the class label attribute.

After candidate clusters in (K+1)-dimensions are formed, all the positive records are scanned to count the number of records that fall in each (K+1)-dimension cluster (step 404).

A record belongs to a (K+1)-dimension cluster if K coordinates of the records satisfy the condition $|d\_i-c\_i|=r\_i$, where $d\_i$ is the i-th coordinate of the record, and $(c\_i, r\_i)$ is the cluster information of the i-th dimension. In addition to the counts, statistics such as mean and variance are collected if K equals MAX_DIMENSION. Then, clusters with support lower than minsup are pruned (step 405).

It is then determined whether all of the clusters in K+1 dimension have been pruned (step 406). If so, then the method is terminated. Otherwise, it is determined whether K>MAX_DIMENSION (step 407). If so, the method is terminated. Otherwise, K is increased by one (step 408), and the method returns to step 403.

Figure 5:
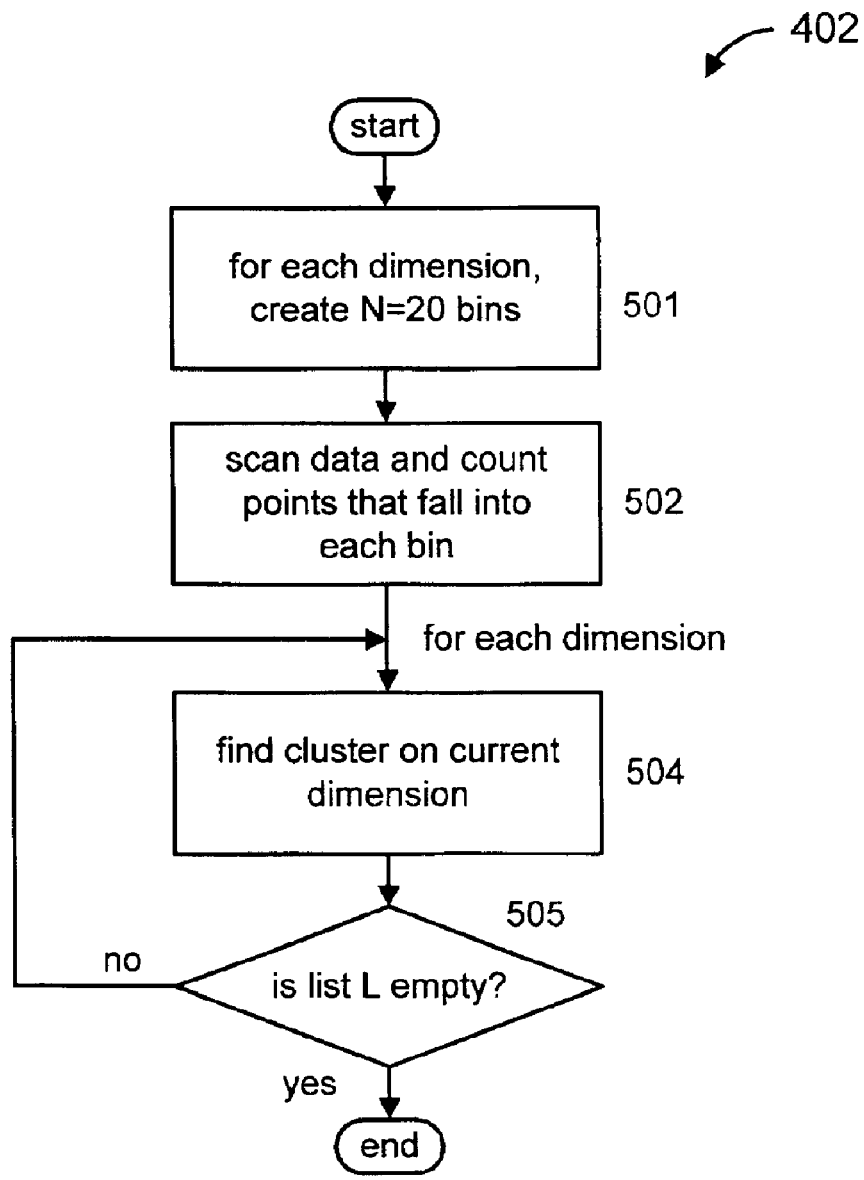
FIG. 5 is a diagram illustrating the process of discovering one-dimensional clusters of positive points (step 402 of FIG. 4), according to an illustrative embodiment of the invention.

FIG. 5 is a diagram illustrating the process of discovering one-dimensional clusters of positive points (step 402 of FIG. 4), according to an illustrative embodiment of the invention. First, each dimension is divided into N=20 equal-length bins (step 501). One scan of all the positive records is performed, and the records that fall into each bin are counted (step 502). For each dimension, steps 503–505 are performed. At step 503, a histogram is constructed for the current dimension. At step 504, the histogram for the current dimension is used to find clusters on the current dimension. Step 504 is further described below with respect to FIG. 6. At step 505, it is determined whether the current dimension is the last dimension. If so, then the method is terminated. Otherwise, the method returns to step 503 to process the next dimension.

Figure 6:
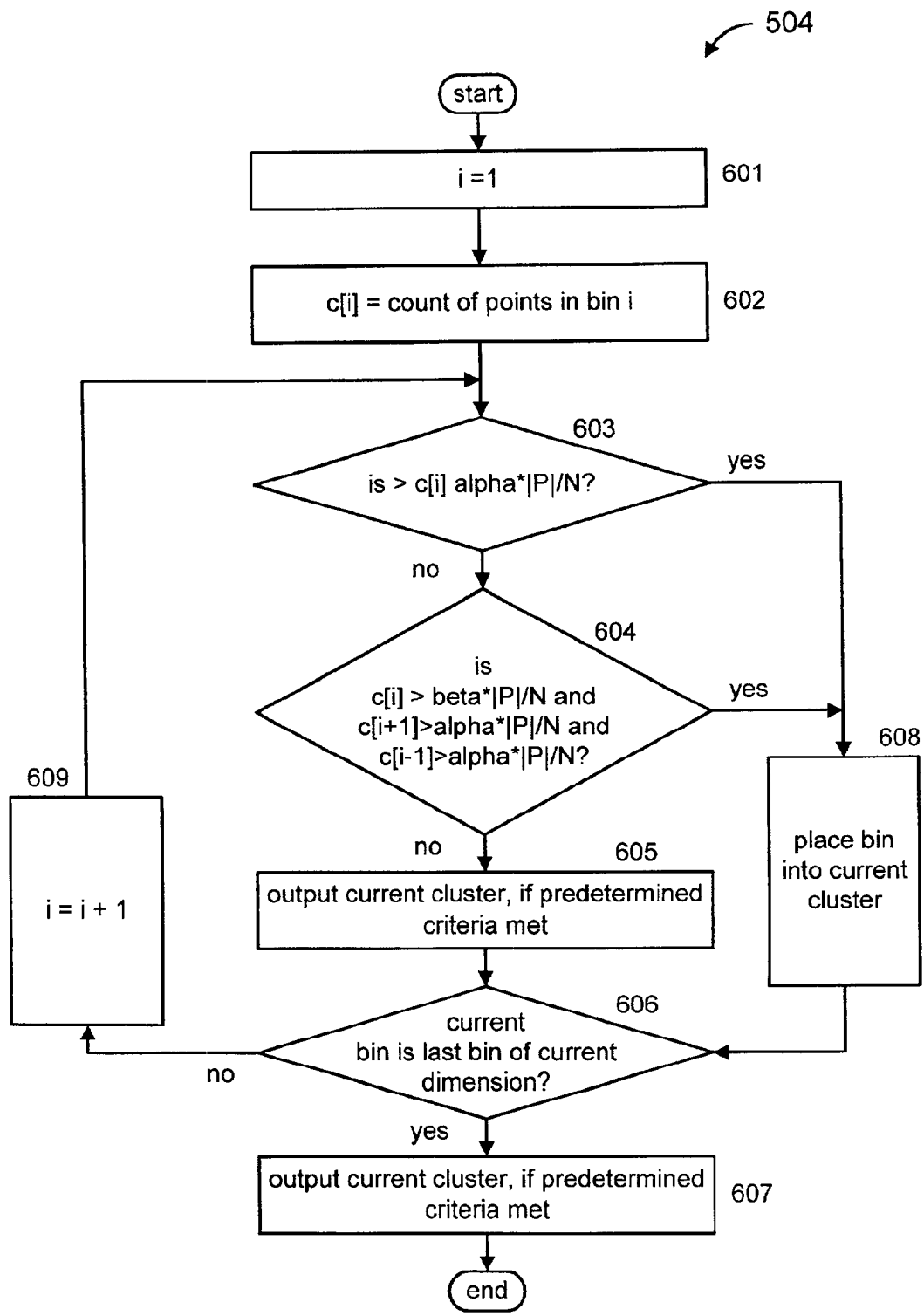
FIG. 6 is a diagram illustrating the process of discovering clusters of positive points on a given dimension using a histogram (step 504 of FIG. 5), according to an illustrative embodiment of the invention.

FIG. 6 is a diagram illustrating the process of discovering clusters of positive points on a given dimension using a histogram (step 504 of FIG. 5), according to an illustrative embodiment of the invention. The value i is set to 1 (step 601). One scan of the histogram is performed (step 602) and, for each bin, it is determined whether the number of records in the bin is large enough to be within a cluster using the criteria specified per steps 603 and 604. The criteria of this determination is as follows: (1) the number of records in the i-th bin, $c[i]$, satisfies the condition $c[i]>alpha*|P|/N$, where alpha is a user-defined ratio (the method uses alpha=2), $|P|$ is the total number of positive records in the current node, and N is the number of bins (step 603); or (2) the number of records in the i-th bin satisfies the condition $c[i]>beta*|P|/N$, where beta is a user-defined ratio (the method uses beta=1), and the number of records in the (i−1)-th and (i+1)-th bin satisfy the first criteria, i.e., $c[i-1]>alpha*|P|/N$ and $c[i+1]>alpha*|P|/N$ (step 604). Usually, alpha is larger than beta (for example, alpha=2 and beta=1). The intuition is that a bin is considered to be inside a cluster if the density of the bin is alpha times above the average density ($|P|/N$), and two bins are considered to be inside the same cluster if both of the bins exceed the density threshold and the density of the only bin between them is at least above beta times the average density.

If any of the above two criteria of steps 603 and 604 are met, then the bin is added into the current cluster (step 608) and it is determined whether the current bin is the last bin of the current dimension (step 606). If none of the criteria are met (per steps 603 and 604), or the current bin is the last bin of the dimension (per step 606), then the current cluster is output depending upon whether predetermined criteria are met (step 605, 607). The predetermined criteria is as follows: whether the number of records in the current cluster is above $minsup=(2q-2q^2-G\_best)/(2q-2q^2-qG\_best)$. If the predetermined criteria is satisfied so, then a 1-dimensional cluster is found and reported in the form of (c, r), where c is the mean of the projection of all the records in the cluster on the current dimension and r is the radius of all the projections. In the case of step 605, the method proceeds to step 606 thereafter. In the case of step 607, the method is terminated thereafter.

If it is determined at step 606 that the current bin is not the last bin, then i is incremented by 1 (i=i+1) (step 609), and the method returns to step 603.

Figure 7:
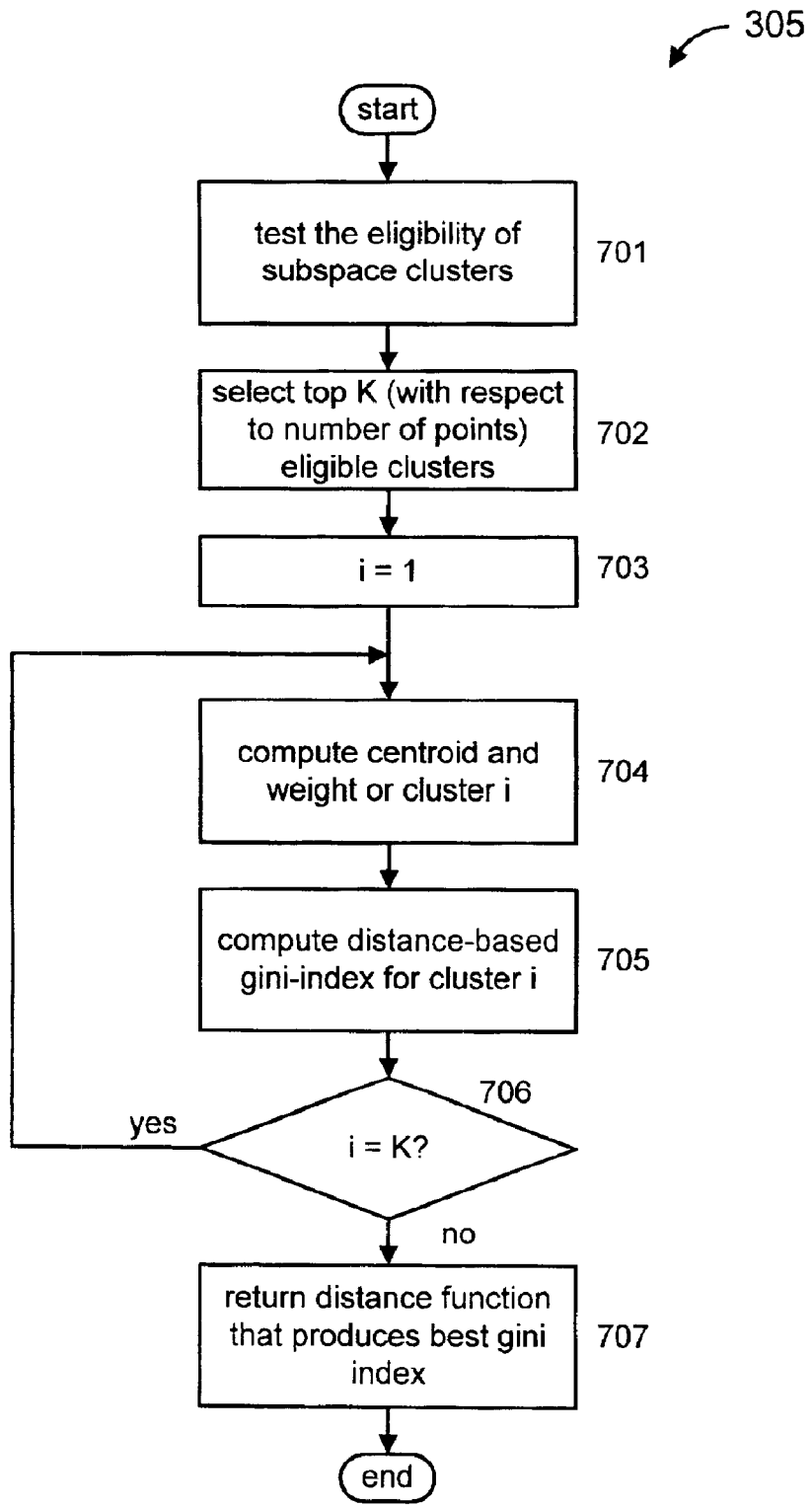
FIG. 7 is a diagram illustrating the process of computing the gini index based on distances to the top K clusters of positive points (step 305 of FIG. 4), according to an illustrative embodiment of the invention.

FIG. 7 is a diagram illustrating the process of computing the gini index based on distances to the top K clusters of positive points (step 305 of FIG. 4), according to an illustrative embodiment of the invention. That is, FIG. 7 illustrates the process of finding the best gini index of distance-based splitting. First, the eligibility of each sub-space cluster is tested (step 701). To be eligible, a cluster must not be a sub-cluster of another cluster. That is, if cluster A is eligible, and cluster A clusters on a set of dimensions D, then there is no such cluster A' that clusters on a set of dimensions D', and D is a true subset of D'. Besides, all eligible clusters must have minimal support larger than minsup.

Next, the top K clusters ordered by the number of records inside the cluster are selected (step 702). The reason that the method needs to test multiple clusters is because there is no information whether each cluster is pure, that is, whether each cluster contains records of the negative class. A pure cluster with the largest number of records will achieve the lowest gini index. However, since the purity is unknown, the method tests multiple clusters to find the best gini index.

A counter value "i" is set to 1 (step 703). Then, for each of the top K clusters, the centroid of the cluster and the weight of each dimension are computed (step 704). The centroid is the mean of all the records in the cluster, and the weight on a clustered dimension is the $1/r^2$, where r is the radius (span) of the records on that dimension. The weight on a non-clustered dimension is set to 0. The set of non-zero weights thus define a subspace.

With the centroid and weights, the method is able to compute the gini index based on the weighted Euclidean distance to the centroid (step 705). This process is carried out for each of the top K cluster and is detailed in FIG. 8. It is then determined whether "i" is less than or equal to K (step 706). If so, then the method returns to step 704. Otherwise, the lowest gini index achieved is recorded, along with the centroid, the weights and the splitting position where the gini index occurs (step 707).

Figure 8:
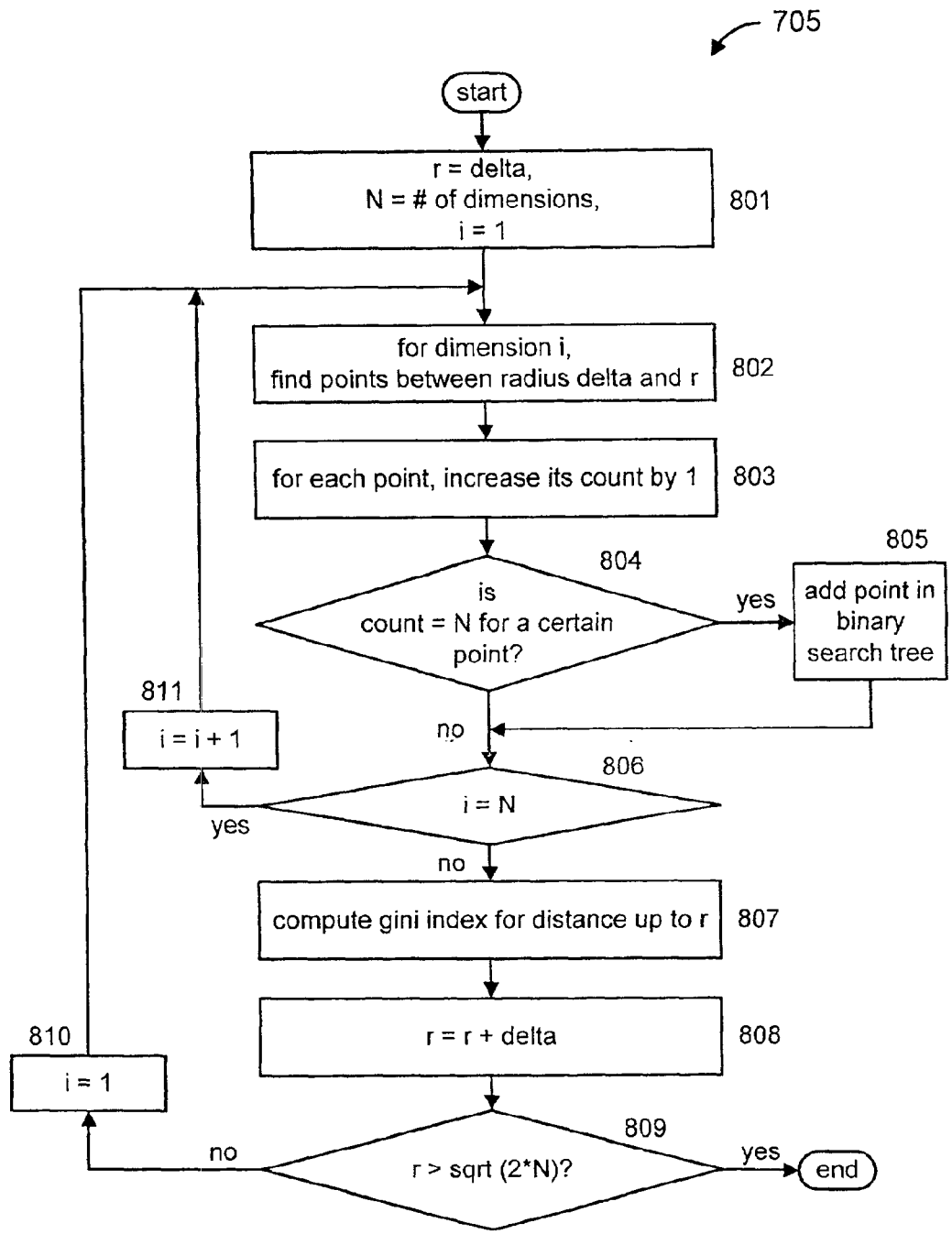
FIG. 8 is a diagram illustrating the process of finding the splitting position and the gini index of partition based on the distance to a given cluster of position points (step 705 of FIG. 7), according to an illustrative embodiment of the invention.

FIG. 8 is a diagram illustrating the process of finding the splitting position and the gini index of partitions based on the distance to a given cluster of position points (step 705 of FIG. 7), according to an illustrative embodiment of the invention. The method takes advantage of the sorted attribute lists and avoids globally reordering all the data and any loss of accuracy that often comes with discretization methods. The method finds all the records that are within a radius r on each dimension to the centroid of the cluster on that dimension.

Initially, the radius r is set to a small value (delta), a total number of dimensions in a cluster is set to "N", and a counter value "i" is set to 1 (step 801). It should be noted that the radius r is increased by delta (r=r+delta) for each repetition at step 808 below.

For each dimension i, all the points between radius r and (r−delta) are found (step 802). That is, for each dimension i, all the records d are found that satisfy the condition $(r-delta)^2=w\_i(d\_i-p\_i)^2<r^2$, where $w\_i$ is the weight on the i-th dimension, $p\_i$ is the coordinate of the centroid of the cluster on the i-th dimension. Thus, the records d are inside a ring comprised of an inner circle and an outer circle, wherein the inner circle has a radius (r−delta) and the outer circle has a radius r. This process is efficient because the method has the sorted attribute lists available. The value closest to p_i is located through a binary search on the ordered attribute list, and two pointers to the value are initialized. Then, the first pointer is moved backward and the second pointer is moved forward and the condition is incrementally tested on the values that are included between the two pointers.

For each record, there is a counter, which is set to 0 initially. Whenever d satisfies the above condition on a certain dimension, the counter is increased by 1 (step 803). It is then determined whether the counter of a record has reached N (the total number of clustered dimensions) (step 804). If so, then the weighted distance between d and the centroid of the cluster is between (r−delta) and r on each dimension. Thus, the weighted Euclidean distance between d and the centroid of the cluster is at most r*sqrt(N). Those records are collected and sorted.

The gini index is computed based on the weighted distance (up to radius r) (step 807). Since all the records that are within radius r to the centroid are collected, this approach is accurate. After the gini index (up to radius r) is computed, the radius r is increased by delta (step 808), and the attribute lists are consulted again for more records that satisfy the (relaxed) condition.

It is determined whether the radius is larger than sqrt(2*N) (step 809). If so, then the method is terminated. This is because the method expects a good gini index to be found at the boundary of the cluster. With the weighted Euclidean distances, records that belong to the cluster must satisfy the condition $w\_i*(d\_i-p\_i)^2<1$ on all the clustered dimension i. This condition is relaxed to consider a fair amount of records that satisfy $w\_i*(d\_i-p\_i)^2<2$. Thus, the maximum radius to be considered is sqrt(2*N).

If it is determined at step 809 that r is not greater than sqrt(2*N), then i is reset to 1 (step 810) and the method returns to step 802.

Figure 9:
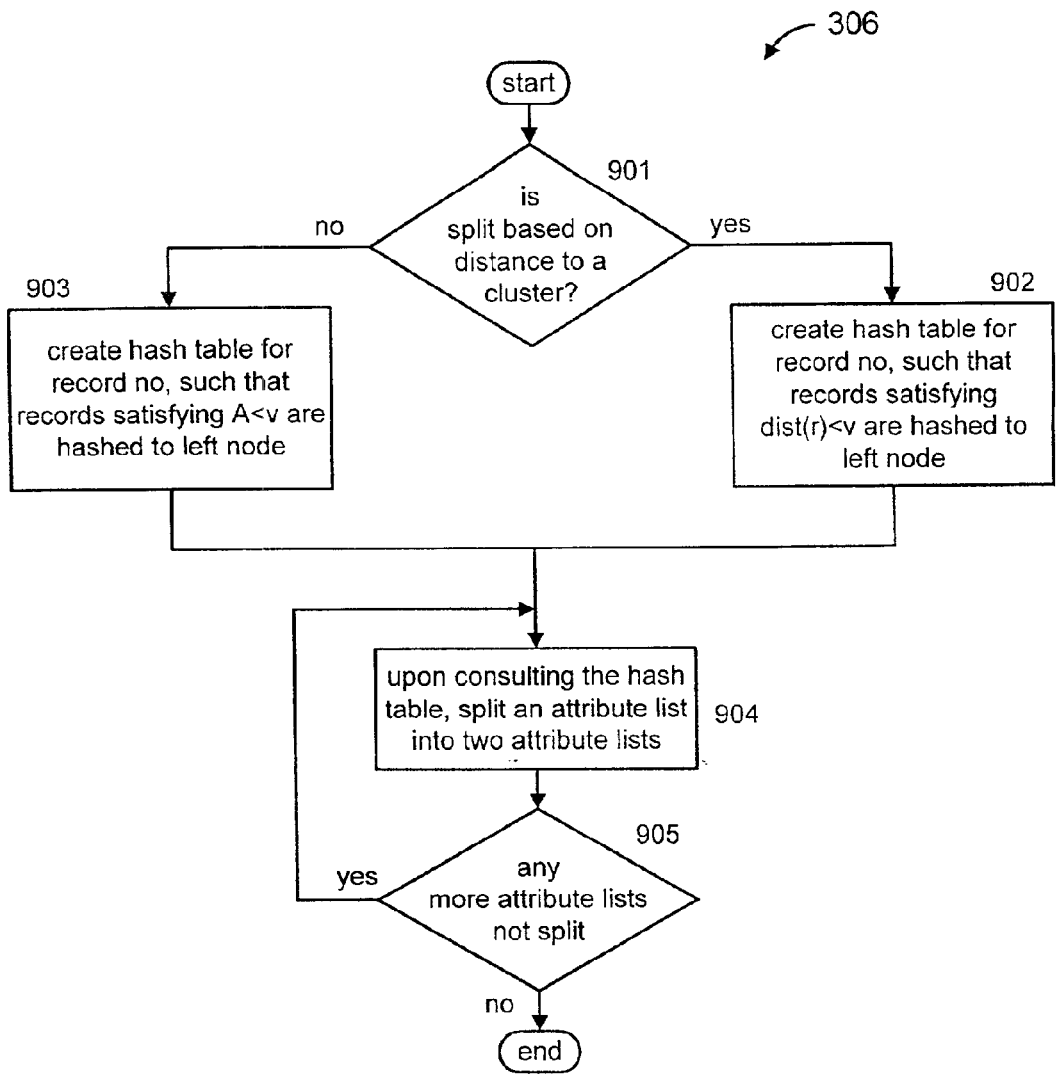
FIG. 9 is a diagram illustrating the process of partitioning the attribute lists of a node into attribute lists for its child nodes (step 306 of FIG. 3), according to an illustrative embodiment of the invention.

FIG. 9 is a diagram illustrating the process of partitioning the attribute lists of a node into attribute lists for its child nodes (step 306 of FIG. 3), according to an illustrative embodiment of the invention. The partitioning is based on the best gini index found by the method.

Initially, it is determined whether the split is based on distance to a cluster (step 901). If not, then the partition is based on a single attribute, and the condition discovered by the method will have the form of A=v, where A is an attribute, and value v defines the splitting position. A hash table is created which maps the record ids (rids) of those records that satisfy A=v to the left child node (i.e., hash(rid)=LEFT), and maps the rids of those records that do not satisfy A=v to the right child node (i.e., hash(rid)=RIGHT) (step 903).

In contrast, if it is determined at step 901 that the split is based on distance to a cluster, then the partition is based on subspace splitting, and the condition discovered by the method will have the form of Dist(d, p, w)=v, where d is the record, p the centroid of the cluster and w is the weights of the dimensions. A hash table is created which maps the record ids (rids) of those records that satisfy Dist(d, p, w)=v to the left child node (i.e., hash(rid)=LEFT), and maps the rids of those records that do not satisfy Dist(d, p, w)=v to the right child node (i.e., hash(rid)=RIGHT) (step 902).

Then, the hash table is consulted and each sorted attribute list is split into two attribute lists (step 904). For each entry (rid, value, class_label) of a given attribute list, the hash table hash(rid) is consulted to find out whether this entry should belong to the left child node (if hash(rid)=LEFT) or the right child node, and the entry is appended to the attribute list of the left or right child node, as appropriate.

Since the method sequentially processes the entries in ordered attribute lists, the resulting attribute lists will maintain the order.

It is then determined whether there are any more attribute lists that have not been split (step 905). If so, then the method returns to step 904. Otherwise, the method is terminated.

Figure 10:
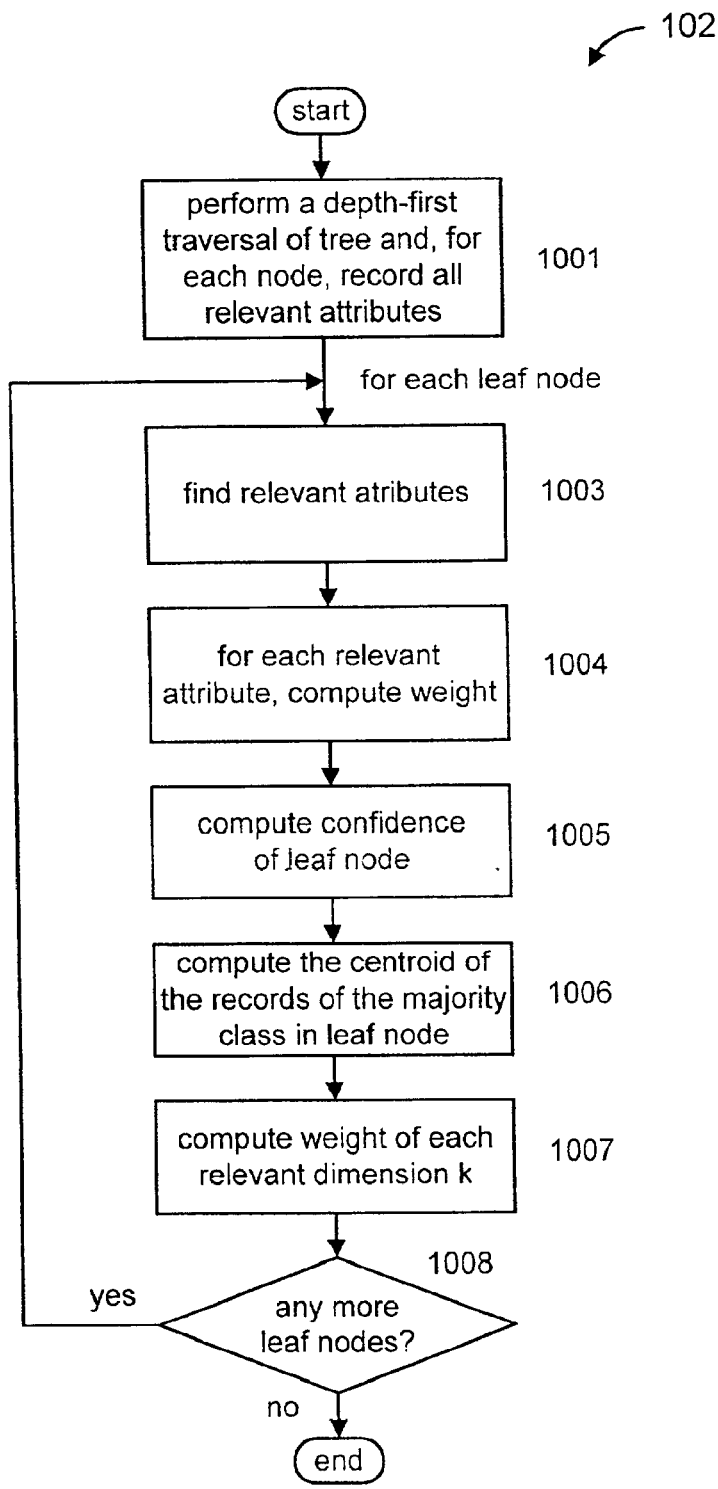
FIG. 10 is a diagram illustrating the process of constructing distance functions for each leaf node of the decision tree (step 102 of FIG. 1), according to an illustrative embodiment of the invention.

FIG. 10 is a diagram illustrating the process of constructing distance functions for each leaf node of the decision tree (step 102 of FIG. 1), according to an illustrative embodiment of the invention. First, a depth-first traversal of the decision tree is performed and, for each leaf node, all of the relevant attributes are recorded (step 1001). This traversal is actually not an extra step. The implementation will incorporate it into the construction of the decision tree (i.e., step 101 of FIG. 1). The step is explained here for clarity purposes.

For each leaf node of the decision tree, steps 1003 through steps 1008 are performed. At step 1003, relevant attributes are identified. An attribute k is considered relevant to the points in leaf node i if in any node on the path from the root node to the leaf node, one of the following 3 conditions is met: (1) attribute k appears in the univariate test that splits the node; or (2) attribute k appears in the distance function test with a non-zero weight that splits the node; or (3) attribute k does not appear in any tests, but the points on leaf node i are clustered on dimension k. Clusters are detected by using the same process as described above with respect to FIG. 6.

For each relevant attribute, a weight is computed therefore (step 1005). The weight is set to $w\_k=1/r\_k^2$, where r_k is the radius of attribute k coordinates of the points in the majority class of leaf node i. For each irrelevant attribute k, the weight is set to w_k=0.

Then, for each leaf node, the confidence is computed (step 1005). The confidence is defined as (n_p−n_n)/(n_p+n_n+1), where n_p is the number of positive records in the node, and n_n is the number of negative nodes. The intuition is that the more records a node has, and the purer the node, the larger the absolute value of its confidence.

The centroid of the records of the majority class in the leaf nodes is computed (by computing the mean of the coordinates on each dimension) (step 1006). The weight of each relevant dimension k is computed (step 1007). A dimension k is considered relevant to the points in leaf node i if in any node on the path from the root node to the leaf node, one of the following 3 conditions is met: (1) dimension k appears in the univariate test that splits the node; or (2) dimension k appears in the distance function test with a non-zero weight that splits the node; or (3) dimension k does not appear in any tests, but the points on leaf node i are clustered on dimension k, as determined by the variance. If dimension k is relevant, then the weight w_k on dimension k is defined as $1/r\_k^2$, where r_k is the radius of the records of the majority class in the leaf node. If dimension k is not relevant, then the method sets w_k to 0.

The distance functions are defined after the method finds the relevant dimensions, confidences, weights, and centroids of each leaf node.

It is then determined whether there are any more leaf nodes (step 1008). If so, then the method returns to step 1003. Otherwise, the method is terminated.

Figure 11:
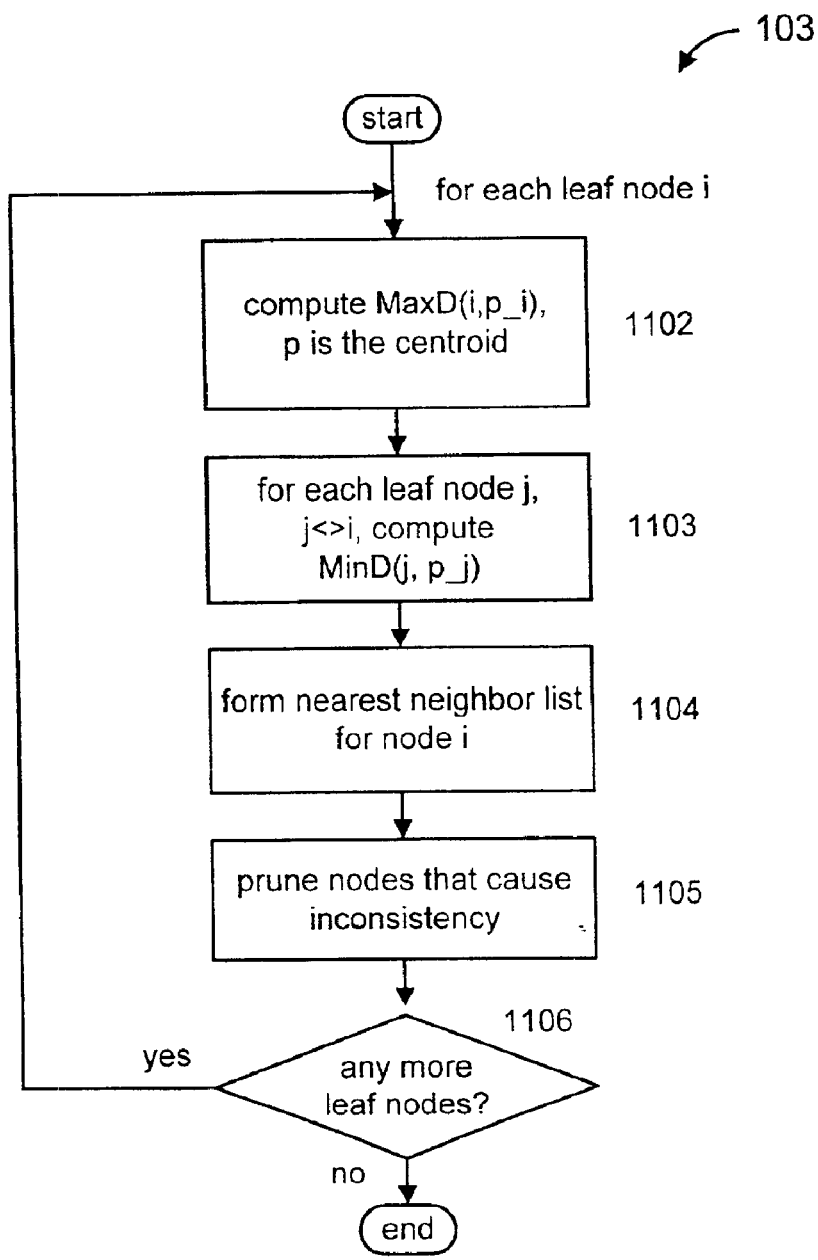
FIG. 11 is a diagram illustrating the process of constructing the nearest neighbor set for each leaf node of the decision tree (step 103 of FIG. 1), according to an illustrative embodiment of the invention.

FIG. 11 is a diagram illustrating the process of constructing the nearest neighbor set for each leaf node of the decision tree (step 103 of FIG. 1), according to an illustrative embodiment of the invention. First, for each leaf node i, steps 1102 through 1106 are performed. At step 1102, the maximal distance of the current leaf node i is computed, that is, the maximum distance between the centroid of the leaf node i and any record that belongs to leaf node i, according to the decision tree induction process. Next, at step 1103, the method checks all the other leaf nodes, and computes the minimal distance, that is, the minimum distance between the centroid of leaf node i and any record that belongs to other leaf nodes. Those leaf nodes that have a minimal distance smaller than the maximum distance of node i form the nearest neighbor set of leaf node i at step 1104.

It is straightforward to compute the max-distance and the min-distance. Basically, for each dimension, a coordinate is found that is within the boundary of the leaf node, and has the maximum (minimum) distance to the coordinate of the centroid on that dimension.

If the size of the nearest neighbor set is large the space of the minimal bounding rectangle (MBR) is partitioned into co-centric spheres centered on the centroid. For each sphere, the maximal distance is computed, that is, the maximum distance between the centroid of the leaf node and any record that falls into the sphere. The minimum distances are computed as before. Then, for each sphere, a separate set of nearest neighbor is kept.

After the nearest neighbor set is found for each leaf node, those nodes in the nearest neighbor set that cause inconsistency are pruned at step 1105. A node causes inconsistency if the minimal bounding rectangle (MBR) of the node contains the MBR of the leaf node.

At step 1106, it is determined whether there are any more leaf nodes. If so, the method returns to step 1102. Otherwise, the method is terminated.

Figure 12:
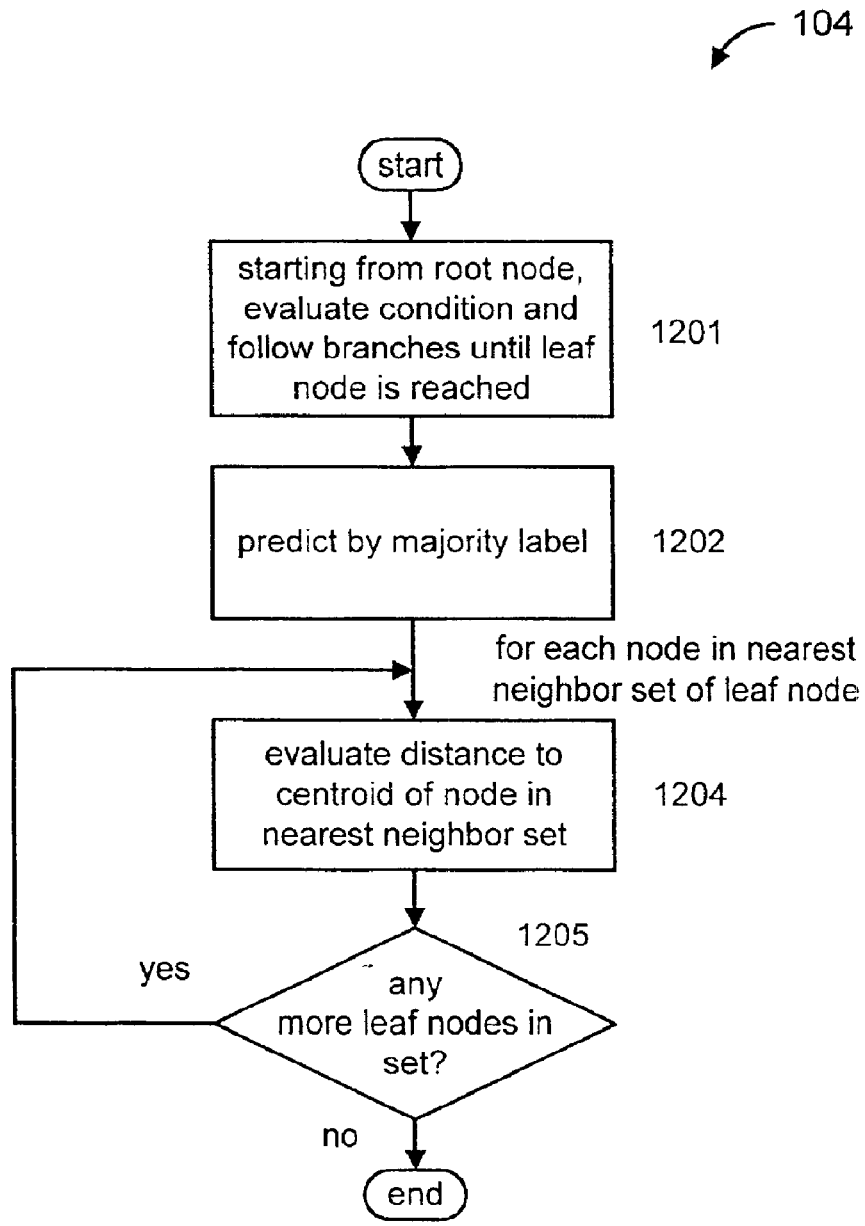
FIG. 12 is a diagram illustrating the process of using the decision tree and the nearest neighbor sets for data classification and scoring (step 104 of FIG. 1), according to an illustrative embodiment of the invention.

FIG. 12 is a diagram illustrating the process of using the decision tree and the nearest neighbor sets for data classification and scoring (step 104 of FIG. 1), according to an illustrative embodiment of the invention. Given a record, the tree induction process starts from the root node of the decision tree.

On each node of the decision tree (starting with the root node), the Boolean condition is evaluated and branches are followed until a leaf node of the decision tree is reached (step 1201). As usual, the majority class on the leaf node is given as the prediction (step 1202).

The nearest neighbor set of the leaf node is used for data scoring. Thus, for each node in the nearest neighbor set, steps 1204 and 1205 are performed. At step 1204, the distance between the record and the centroid of the node is computed using the distance function defined for that node. The record is scored using the maximum value of the score function, which is defined as Conf/Dist(d,p,w), where Conf is the confidence of the node.

At step 105, it is then determined whether there are any more nodes in the nearest neighbor set of the leaf node. If so, the method returns to step 1204. Otherwise, the method is terminated.

A brief description of some of the many aspects and advantages of the invention will now be given. The invention provides a method for classifying and scoring data sets. Each record in the data set has a special attribute called "class label", which can take on one of two possible values: positive or negative. The class distribution of the data is very biased, in as much as the positive records account for only a small fraction (e.g., 1%, of course, other percentages are included within the scope of the invention) of the entire data set. Other attributes of the data set are numerical or ordinal, and their values are normalized to the range of [0,1] by a preprocessing step.

Each record in the data set is assigned a weight, which is a real number. The purpose of assigning weights to records is to rebalance the biased class distribution so that both positive and negative records are equally represented. Thus, all the negative records are assigned a weight 1, and all positive records are assigned a weight nn/np, where nn is the number of negative records in the data set and np is the number of positive records in the data set.

Records in a node are split based on their distance to one particular cluster of positive records. The distance function is a weighted Euclidean distance measure defined in a subspace of the entire dimensions. Records whose distance to the center of the cluster is less than the splitting value are put into the left child node of the current node and the remaining records are put into the right child node. The splitting process is performed recursively on the child nodes.

Subspace clusters of positive records are located. Sets of clusters are found with a size (the number of records in the cluster) beyond a predefined threshold. Clusters whose size is below the threshold are pruned because they can not achieve a lower gini index than splitting on some single attribute.

Weights are determined on each dimension of a cluster. Irrelevant dimensions (the dimensions that the positive points are not clustered on) are assigned a zero weight. Clustered dimensions are assigned a weight inversely proportional to the span of the records on those dimensions.

A splitting position is decided without globally reordering the entire data set in the current node. The invention takes advantage of the sorted attribute lists and selectively tests a set of records that are close to the centroid on a certain dimension. Their distances to the centroid of the cluster might be used as the splitting position.

A distance function is constructed for each leaf node of the decision tree. Each distance function is a weighted Euclidean distance. However, the distance functions are defined in a subspace of the entire dimension space. A dimension is assigned a zero weight if the dimension is not used in any condition from the root to the leaf node and the records in the leaf node are not clustered on that dimension. Other dimensions are assigned a score inversely proportional to the span of the records on those dimensions.

A nearest neighbor set is constructed for each leaf node. For any record that belongs to the leaf node according to the decision tree induction process, only nodes in the nearest neighbor set can assign a potentially higher score than the score assigned by the leaf node the record belongs to.

The data set is scored using the decision tree as well as the nearest neighbor set on each leaf node. For each record, the leaf node the record belongs to is found by following the conditions associated with each node starting from the root of the decision tree. The distance functions of those nodes in the nearest neighbor set of the leaf node are evaluated and the distance function that provides the minimal distance is chosen. The score of the record is thus defined by the confidence of the leaf node divided by the minimal distance.

The invention uses multivariate conditions in partitioning the data set. Thus, a much more compact model can be built from the data set. This greatly enhances the interpretability of the decision tree model. The method uses multivariate splitting conditions without jeopardizing efficiency, and the method is scalable for large data sets. The model of the invention may be used when the data set has a biased distribution, where the class the user is interested in (the target class) accounts for a very small fraction of the entire data set. Moreover, a score function is defined based on the distance of a given record to the centroid of each leaf node. Thus, the model may be used to score data according to their closeness to the target class.

What is claimed is:

1. A method for building a decision tree from an input data set, the input data set comprising records and associated attributes, the attributes including a class label attribute for indicating whether a given record is a member of a target class or a non-target class, the input data set being biased in favor of the records of the non-target class, the decision tree comprising a plurality of nodes that include a root node and leaf nodes, said method comprising the steps of:

constructing the decision tree from the input data set, including the step of partitioning each of the plurality of nodes of the decision tree, beginning with the root node, based upon multivariate subspace splitting criteria;

computing distance functions for each of the leaf nodes;

identifying, with respect to the distance functions, a nearest neighbor set of nodes for each of the leaf nodes based upon a respective closeness of the nearest neighbor set of nodes to a target record of the target class; and classifying and scoring the records, based upon the decision tree and the nearest neighbor set of nodes;

wherein said partitioning step comprises the step of:

for a current leaf node from among the leaf nodes of the decision tree, computing a lowest value of a gini index achieved by univariate-based partitions on each of a plurality of attribute lists included in the current leaf node; and wherein the gini index is equal to $1-(P\_n)^2-(P\_p)^2$, $P\_n$ being a percentage of the records of the non-target class in the input data set and $P\_p$ being a percentage of the records of the target class in the input data set.

2. A method for building a decision tree from an input data set, the input data set comprising records and associated attributes, the attributes including a class label attribute for indicating whether a given record is a member of a target class or a non-target class, the input data set being biased in favor of the records of the non-target class, the decision tree comprising a plurality of nodes that include a root node and leaf nodes, said method comprising the steps of:

constructing the decision tree from the input data set, including the step of partitioning each of the plurality of nodes of the decision tree, beginning with the root node, based upon multivariate subspace splitting criteria;

computing distance functions for each of the leaf nodes;

identifying, with respect to the distance functions, a nearest neighbor set of nodes for each of the leaf nodes based upon a respective closeness of the nearest neighbor set of nodes to a target record of the target class; and classifying and scoring the records, based upon the decision tree and the nearest neighbor set of nodes;

wherein said partitioning step comprises the step of:

for a current leaf node from among the leaf nodes of the decision tree, computing a lowest value of a gini index achieved by univariate-based partitions on each of a plurality of attribute lists included in the current leaf node; and wherein the percentage of the records $P\_p$ in the input data set is equal to $W\_p*n\_p/(W\_p*n\_p+n\_n)$, $W\_p$ being a weight of the records of the target class in the input data set, $n\_p$ and $n\_n$ being a number of the records of the target class and a number of the records of the non-target class in the current leaf node, respectively.

3. A method for building a decision tree from an input data set, the input data set comprising records and associated attributes, the attributes including a class label attribute for indicating whether a given record is a member of a target class or a non-target class, the input data set being biased in favor of the records of the non-target class, the decision tree comprising a plurality of nodes that include a root node and leaf nodes, said method comprising the steps of:

constructing the decision tree from the input data set, including the step of partitioning each of the plurality of nodes of the decision tree, beginning with the root node, based upon multivariate subspace splitting criteria;

computing distance functions for each of the leaf nodes;

identifying, with respect to the distance functions, a nearest neighbor set of nodes for each of the leaf nodes based upon a respective closeness of the nearest neighbor set of nodes to a target record of the target class; and classifying and scoring the records, based upon the decision tree and the nearest neighbor set of nodes;

wherein said partitioning step comprises the step of:

for a current leaf node from among the leaf nodes of the decision tree, computing a lowest value of a gini index achieved by univariate-based partitions on each of a plurality of attribute lists included in the current leaf node; and wherein said partitioning step further comprises the steps of:

detecting subspace clusters of the records of the target class associated with the current leaf node;

computing the lowest value of the gini index achieved by distance-based partitions on each of the plurality of attribute lists included in the current leaf node, the distance-based partitions being based on distances to the detected subspace clusters;

partitioning pre-sorted attribute lists included in the current node into two sets of ordered attribute lists based upon a greater one of the lowest value of the gini index achieved by univariate partitions and the lowest value of the gini index achieved by distance-based partitions; and creating new child nodes for each of the two sets of ordered attribute lists; and wherein said detecting step comprises the steps of:

computing a minimum support (minsup) of each of the subspace clusters that have a potential of providing a lower gini index than that provided by the univariate-based partitions;

identifying one-dimensional clusters of the records of the target class associated with the current leaf node;

beginning with the one-dimensional clusters, combining centroids of K-dimensional clusters to form candidate (K+1)-dimensional clusters;

identifying a number of the records of the target class that fall into each of the (K+1)-dimensional clusters;

pruning any of the (K+1)-dimensional clusters that have a support lower than the minsup.

4. The method of claim 3, wherein the support of a subspace cluster is denoted as $n\_p'/n\_p$, $n\_p'$ being a number of the records of the target class in the subspace cluster, and $n\_p$ being a total number of the records of the target class in the current leaf node.

5. The method of claim 4, wherein the minsup is denoted as $(2q-2q^2-G\_best)/(2q-2q^2-qG\_best)$, $G\_best$ being a smallest gini index given by the univariate-based partitions, q being $n\_p,/n\_n$, and $n\_n$ being a total number of the records in the current leaf node.

6. The method of claim 3, wherein said step of identifying the one-dimensional clusters of the records of the target class comprises the steps of:

dividing a domain of each dimension of a data set associated with the current leaf node into a predetermined number of equal-length bins;

identifying all of the records of the target class falling into each of the predetermined number of equal-length bins; and for each of a current dimension of the data set associated with the current leaf node,
constructing a histogram for the current dimension; and
identifying clusters of records of the target class on the current dimension, using the histogram.

7. A method for building a decision tree from an input data set, the input data set comprising records and associated attributes, the attributes including a class label attribute for indicating whether a given record is a member of a target class or a non-target class, the input data set being biased in favor of the records of the non-target class, the decision tree comprising a plurality of nodes that include a root node and leaf nodes, said method comprising the steps of:

constructing the decision tree from the input data set, including the step of partitioning each of the plurality of nodes of the decision tree, beginning with the root node, based upon multivariate subspace splitting criteria;

computing distance functions for each of the leaf nodes;

identifying, with respect to the distance functions, a nearest neighbor set of nodes for each of the leaf nodes based upon a respective closeness of the nearest neighbor set of nodes to a target record of the target class; and classifying and scoring the records, based upon the decision tree and the nearest neighbor set of nodes;

wherein said partitioning step comprises the step of:

for a current leaf node from among the leaf nodes of the decision tree,
computing a lowest value of a gini index achieved by univariate-based partitions on each of a plurality of attribute lists included in the current leaf node; and wherein said partitioning step further comprises the steps of:

detecting subspace clusters of the records of the target class associated with the current leaf node;

computing the lowest value of the gini index achieved by distance-based partitions on each of the plurality of attribute lists included in the current leaf node, the distance-based partitions being based on distances to the detected subspace clusters;

partitioning pre-sorted attribute lists included in the current node into two sets of ordered attribute lists based upon a greater one of the lowest value of the gini index achieved by univariate partitions and the lowest value of the gini index achieved by distance-based partitions; and creating new child nodes for each of the two sets of ordered attribute lists; and wherein said step of computing the lowest value of the gini index achieved by distance-based partitions comprises the steps of:

identifying eligible subspace clusters from among the subspace clusters, an eligible subspace cluster having a set of clustered dimensions such that only less than all of the clustered dimensions in the set are capable of being included in another set of clustered dimensions of another subspace cluster;

selecting top-K clusters from among the eligible subspace clusters, the top-K clusters being ordered by a number of records therein;

for each of a current top-K cluster,
computing a centroid of the current top-K cluster and a weight on each dimension of the current top-K cluster; and
computing the gini index of the current top-K cluster, based on a weighted Euclidean distance to the centroid; and recording a lowest gini index achieved by said step of computing the gini index of the current top-K cluster.

8. A method for building a decision tree from an input data set, the input data set comprising records and associated attributes, the attributes including a class label attribute for indicating whether a given record is a member of a target class or a non-target class, the input data set being biased in favor of the records of the non-target class, the decision tree comprising a plurality of nodes that include a root node and leaf nodes, said method comprising the steps of:

constructing the decision tree from the input data set, including the step of partitioning each of the plurality of nodes of the decision tree, beginning with the root node, based upon multivariate subspace splitting criteria;

computing distance functions for each of the leaf nodes;

identifying, with respect to the distance functions, a nearest neighbor set of nodes for each of the leaf nodes based upon a respective closeness of the nearest neighbor set of nodes to a target record of the target class; and classifying and scoring the records, based upon the decision tree and the nearest neighbor set of nodes;

wherein said partitioning step comprises the step of:

for a current leaf node from among the leaf nodes of the decision tree,
computing a lowest value of a gini index achieved by univariate-based partitions on each of a plurality of attribute lists included in the current leaf node; and wherein said partitioning step further comprises the steps of:

detecting subspace clusters of the records of the target class associated with the current leaf node;

computing the lowest value of the gini index achieved by distance-based partitions on each of the plurality of attribute lists included in the current leaf node, the distance-based partitions being based on distances to the detected subspace clusters;

partitioning pre-sorted attribute lists included in the current node into two sets of ordered attribute lists based upon a greater one of the lowest value of the gini index achieved by univariate partitions and the lowest value of the gini index achieved by distance-based partitions; and creating new child nodes for each of the two sets of ordered attribute lists; and wherein each of the plurality of pre-sorted attribute lists comprises a plurality of entries, and said step of partitioning the pre-sorted attribute lists comprises the steps of:

determining whether univariate partitioning or distance-based partitioning has occurred;

creating a first hash table that maps record ids of any of the records that satisfy a condition A=v to a left child node and that maps the record ids of any of the records that do not satisfy the condition A=v to a right child node, A being an attribute and v denoting a splitting position, when the univariate partitioning has occurred;

creating a second hash table that maps the record ids of any of the records that satisfy a condition Dist(d, p, w)=v to a left child node and that maps the record ids of any of the records that do not satisfy the condition Dist(d, p, w)=v to a right child node, when the distance-based partitioning has occurred, d being a record associated with a current subspace cluster, p being a centroid of the current subspace cluster, and w being a weight on dimensions of the current subspace cluster;

partitioning the pre-sorted attribute lists into the two sets of ordered attribute lists, based on information in a corresponding one of the first hash table or the second hash table;

appending each entry of the two sets of ordered attribute lists to one of the left child node or the right child node, based on the information in the corresponding one of the first hash table or the second hash table and information corresponding to the each entry, to maintain attribute ordering in the two sets of ordered attribute lists that corresponds that in the pre-sorted attribute lists.

9. A method for building a decision tree from an input data set, the input data set comprising records and associated attributes, the attributes including a class label attribute for indicating whether a given record is a member of a target class or a non-target class, the input data set being biased in favor of the records of the non-target class, the decision tree comprising a plurality of nodes that include a root node and leaf nodes, said method comprising the steps of:

constructing the decision tree from the input data set, including the step of partitioning each of the plurality of nodes of the decision tree, beginning with the root node, based upon multivariate subspace splitting criteria;

computing distance functions for each of the leaf nodes;

identifying, with respect to the distance functions, a nearest neighbor set of nodes for each of the leaf nodes based upon a respective closeness of the nearest neighbor set of nodes to a target record of the target class; and classifying and scoring the records, based upon the decision tree and the nearest neighbor set of nodes;

wherein said classifying and scoring step comprises the steps of:

for each of the plurality of nodes of the decision tree, starting at the root node, evaluating a Boolean condition and following at least one branch of the decision tree until a leaf node is reached;

classifying the reached leaf node based on a majority class of any of the predetermined attributes included therein;

for each node in the nearest neighbor set of nodes for the reached leaf node, computing a distance between a record to be scored and a centroid of the reached leaf node, using a distance function computed for the reached leaf node; and scoring the record using a maximum value of a score function, the score function defined as conf/dist(d,p,w,), wherein the conf is a confidence of the reached node, d is a particular record associated with a current subspace cluster, p is a centroid of the current subspace cluster, and w is a weight on dimensions of the subspace cluster.

* * * * *